Patented Mar. 16, 1926.

1,577,415

UNITED STATES PATENT OFFICE.

LOUIS BENDA, OF MAINKUR, NEAR FRANKFORT-ON-THE-MAIN, AND OTTO SIEVERS, OF FECHENHEIM-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

PRODUCTION OF ACRIDINIUM COMPOUNDS.

No Drawing. Original application filed December 22, 1923, Serial No. 682,305. Divided and this application filed April 18, 1925. Serial No. 24,272.

*To all whom it may concern:*

Be it known that we, LOUIS BENDA, a citizen of the Swiss Confederation, residing at Mainkur, near Frankfort-on-the-Main, Germany, and OTTO SIEVERS, a citizen of the German Empire, residing at Fechenheim-on-the-Main, Germany, have invented certain new and useful Improvements in the Production of Acridinium Compounds, of which the following is a full description.

This application is a division of a previous application of the above named inventors, filed December 22, 1923, Serial No. 682,305.

We have found that hydroxyacridines, as for instance, 3.6-dihydroxyacridine (Benda, B. Ber. 45, 1704), may be alkylated in the acridine nitrogen, without being at the same time alkylated in the hydroxyl group, if alkylation is carried out in the absence of acid binding agents.

According to this invention therefore new acridinium compounds are produced by alkylating a hydroxyacridine in the acridine nitrogen.

In consequence of their high bactericidal property and low toxicity, the new acridinium compounds are excellent antiseptics; their character as dyestuffs is hardly apparent and so they contrast favorably with the corresponding amino-acridinium compounds. They are more soluble and have greater power of diffusion than the salts of 3.6-dimethoxyacridine, 3.6-diethoxyacridine, 3.6-dihydroxyethylacridine and other compounds of the application No. 634,895 of April 26, 1923.

*Example.*

*3.6-dihydroxy-10-methylacridiniumchloride*,
80 litres nitrobenzene are heated to 180° C. and 8.4 kg. dihydroxyacridine then added: the temperature is again raised to 170–180° C., 12 kg. molten *p*-toluene sulfonic acid methylester are added and the whole is heated for 15 minutes to a boil. The dihydroxyacridine gradually dissolves with a brown coloration.

The solution is allowed to stand for 12 hours. The product of the reaction precipitates as a brown crystalline mass and the liquor is decanted by suction. The mass, after being washed with ether, is boiled for some length of time with the addition of 5 litres hydrochloric acid and 200 litres water until the toluenesulphonic acid compound has been transformed into the methyl chloride, then filtered hot and the latter precipitated with hydrochloric acid or common salt. By again dissolving in water and precipitating, the compound is obtained as yellow needles, which very easily dissolve in caustic soda solution.

From the alkylating filtrate further quantities of the product may be obtained.

Instead of the *p*-toluene sulfonic acid methylester other esters and other alkylating agents, such as methyl- or ethyl chloride or iodide etc. may be applied.

Having now particularly described and ascertained the matter of our said invention and in what manner the same is to be performed, we declare that what we claim is:

1. A process for the production of hydroxyacridinium compounds by heating hydroxyacridines with alkylating agents in the absence of acid-binding agents.

2. A process for the production of 3.6 dihydroxy 10-alkylacridinium salts by heating 3.6 dihydroxyacridine with alkylating agents in the absence of acid-binding agents.

3. As new substances hydroxy-10-alkylacridinium-compounds.

4. As new substances 3.6 dihydroxy-10-alkylacridinium-compounds the constitution of which corresponds to the formula.

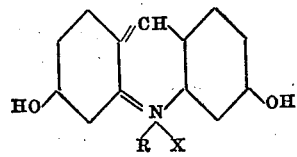

in which formula R means an alkyl radical and X means an anion, being yellow needles, which very easily dissolve in caustic soda solution.

In witness whereof we have hereunto signed our names this 19th day of March, 1925.

LOUIS BENDA.
OTTO SIEVERS.